(12) United States Patent
Chen et al.

(10) Patent No.: US 8,057,100 B2
(45) Date of Patent: Nov. 15, 2011

(54) ROLLER HOLDER FOR MOTION GUIDE DEVICE

(75) Inventors: Tsung-Jen Chen, Taichung (TW); Chia-Huei Chiou, Taichung (TW)

(73) Assignee: Hiwin Technologies Corp., Situn, Taichung (TW)

( * ) Notice: Subject to any disclaimer, the term of this patent is extended or adjusted under 35 U.S.C. 154(b) by 421 days.

(21) Appl. No.: 12/378,987

(22) Filed: Feb. 20, 2009

(65) Prior Publication Data
US 2010/0215295 A1    Aug. 26, 2010

(51) Int. Cl.
*F16C 29/06*    (2006.01)
(52) U.S. Cl. ............................................ 384/45; 384/51
(58) Field of Classification Search .............. 384/43–45, 384/51
See application file for complete search history.

(56) References Cited

U.S. PATENT DOCUMENTS

| | | | |
|---|---|---|---|
| 5,988,883 A | 11/1999 | Takamatu et al. | 384/45 |
| 6,070,479 A | 6/2000 | Shieai | 74/89.15 |
| 6,203,200 B1 * | 3/2001 | Teramachi | 384/51 |
| 6,287,005 B1 * | 9/2001 | Teramachi | 384/44 |
| 6,364,086 B1 | 4/2002 | Blaurock et al. | 193/35 MD |
| 6,575,630 B2 | 6/2003 | Blaurock et al. | 384/43 |
| 6,830,378 B2 | 12/2004 | Michioka et al. | 384/49 |
| 7,918,331 B2 * | 4/2011 | Reist et al. | 384/51 |

* cited by examiner

*Primary Examiner* — Thomas R Hannon
(74) *Attorney, Agent, or Firm* — Charles E. Baxley

(57) ABSTRACT

A roller holder includes a number of couplers disposed between two longitudinal rods for coupling the rods together and for forming a number of compartments to receive rolling members, and two retaining devices disposed in each compartment of the roller holder and attached to the rods for retaining the rolling members in the compartments and between the rods and the couplers of the roller holder, and for preventing the retaining devices from being impacted by the rolling members, the retaining devices each include a projected portion located above the rods and a protruded portion located below the rods and the couplers for engaging with the rolling members.

7 Claims, 6 Drawing Sheets

ROLLER HOLDER FOR MOTION GUIDE DEVICE

BACKGROUND OF THE INVENTION

1. Field of the Invention

The present invention relates to a roller holder, and more particularly to a roller holder having rollers arranged in different directions for engaging between two moving members and for preventing the impact onto the roller holder and for facilitating the sliding movement between the two moving members.

2. Description of the Prior Art

Typical screw shafts comprise a screw member threaded into a nut member, or relatively, a nut member engaged or threaded onto a screw member, and a number of balls engaged in the threads of the nut member and the screw member for facilitating the rotational and/or sliding movement between the nut member and the screw member.

Typical linear motion guide devices or other motion guide devices also comprise two moving members, such as a track rail and a slider slidably engaged with each other, and a number of balls or rollers or rolling members engaged between the two moving members for facilitating the sliding movement between the two moving members.

For example, U.S. Pat. No. 5,988,883 to Takamatu et al. disclose one of the typical endless retainer of guide devices for screw shafts or linear motion guide devices comprising an endless retainer for supporting and retaining a number of balls or rolling bodies together at predetermined intervals for rolling at an inside of two moving members or for being engaged between two moving members and for facilitating the sliding movement between the two moving members. The endless retainer includes a resin connector, and a number of interposing portions connected between two connecting portions for engaging with the ball bearing members or rolling bodies.

However, the interposing portions are connected and disposed between the ball bearing members or rolling bodies, and the ball bearing members or rolling bodies will impact onto and will scrape or scrub the interposing portions particularly when the endless retainer moves in a fast speed between the two moving members such that the abrasion or scraping between the interposing portions and the ball bearing members or rolling bodies will be greatly increased and such that the interposing portions will be quickly worn out.

U.S. Pat. No. 6,070,479 to Shirai discloses another typical rolling element string for a linear motion guide device comprising a link belt including multiple links connected in a line and each formed substantially like a ring with holding parts and having a receiving hole for a rolling element.

However, similarly, the holding parts are also connected and disposed between the rolling elements which will impact onto the holding parts when the rolling element string moves in a fast speed between the two moving members such that the abrasion or scraping between the holding parts and the rolling elements will be greatly increased and such that the holding parts will be quickly worn out or damaged.

U.S. Pat. No. 6,364,086 to Blaurock et al. discloses a further typical chain of rolling elements chain arrangement comprising a number of retainers coupled together with at least one elongate flexible element for coupling or retaining the rolling elements together.

However, similarly, the retainers are also connected and disposed between the rolling elements which will impact onto the retainers when the rolling element chain arrangement moves in a fast speed between the two moving members such that the abrasion or scraping between the retainers and the rolling elements will be greatly increased and such that the retainers will be quickly worn out or damaged.

U.S. Pat. No. 6,575,630 to Blaurock et al., and U.S. Pat. No. 6,830,378 to Michioka et al. disclose two still further typical rolling element chains or strings each also comprising a number of retainers coupled together with at least one elongate flexible element for coupling or securing or retaining the rolling elements together.

However, similarly, the retainers are also connected and disposed between the rolling elements which will impact onto the retainers when the rolling element chain arrangement moves in a fast speed between the two moving members such that the abrasion or scraping between the retainers and the rolling elements will be greatly increased and such that the retainers will be quickly worn out or damaged.

The present invention has arisen to mitigate and/or obviate the afore-described disadvantages of the conventional roller holders for the screw shafts or for the linear motion guide devices.

SUMMARY OF THE INVENTION

The primary objective of the present invention is to provide a roller holder including a number of rollers alternately disposed and arranged in different directions for engaging between two moving members and for preventing the impact onto the roller holder and for facilitating the sliding movement between the two moving members.

In accordance with one aspect of the invention, there is provided a roller holder for engaging between two moving members, the roller holder comprising two longitudinal rods disposed parallel to each other, a number of couplers disposed between the rods for coupling the rods together and for forming a number of compartments between the rods and the couplers, a number of rolling members received in the compartments of the roller holder respectively, and two retaining devices disposed in each of the compartments of the roller holder and attached to the rods and facing toward each other for engaging with the rolling members and for retaining the rolling members in the compartments and between the rods and the couplers of the roller holder, and for preventing the retaining devices from being disposed between the rolling members and for preventing the retaining devices from being impacted by the rolling members.

The two rods include an inner surface directing or facing toward each other, and the retaining devices are preferably attached to the inner surfaces of the rods and disposed or arranged on the side portions of the rolling members, but not disposed or arranged between the rolling members.

The rods each include an ear extended into each compartment of the roller holder, and the retaining devices are preferably attached to the rods with the ears such that the retaining devices are disposed or arranged on the side portions of the rolling members, but not disposed or arranged between the rolling members and such that the retaining devices may not and will not be impacted by the rolling members.

The retaining devices each include a projected portion located above the rods and the couplers for engaging with the rolling members, and a protruded portion located below the rods and the couplers for engaging with the rolling members.

The retaining devices each include at least one first retainer having the projected portion extended from the first retainer for engaging with the rolling members, and at least one second retainer having the protruded portion extended from the second retainer for engaging with the rolling members.

The projected portion is provided on an upper portion of the first retainer, and the protruded portion is provided on a lower portion of the second retainer, and the projected portions of the retaining devices in each compartment of the roller holder include a spacing distance "L1" smaller then an outer diameter "D" of the rolling members, and the protruded portions of the retaining devices in each compartment of the roller holder also include a spacing distance "L2" smaller then an outer diameter "D" of the rolling members.

The first and the second retainers each preferably include a curved inner peripheral surface for smoothly engaging with the rolling members with a point-contact, a line-contact or a surface-contact.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
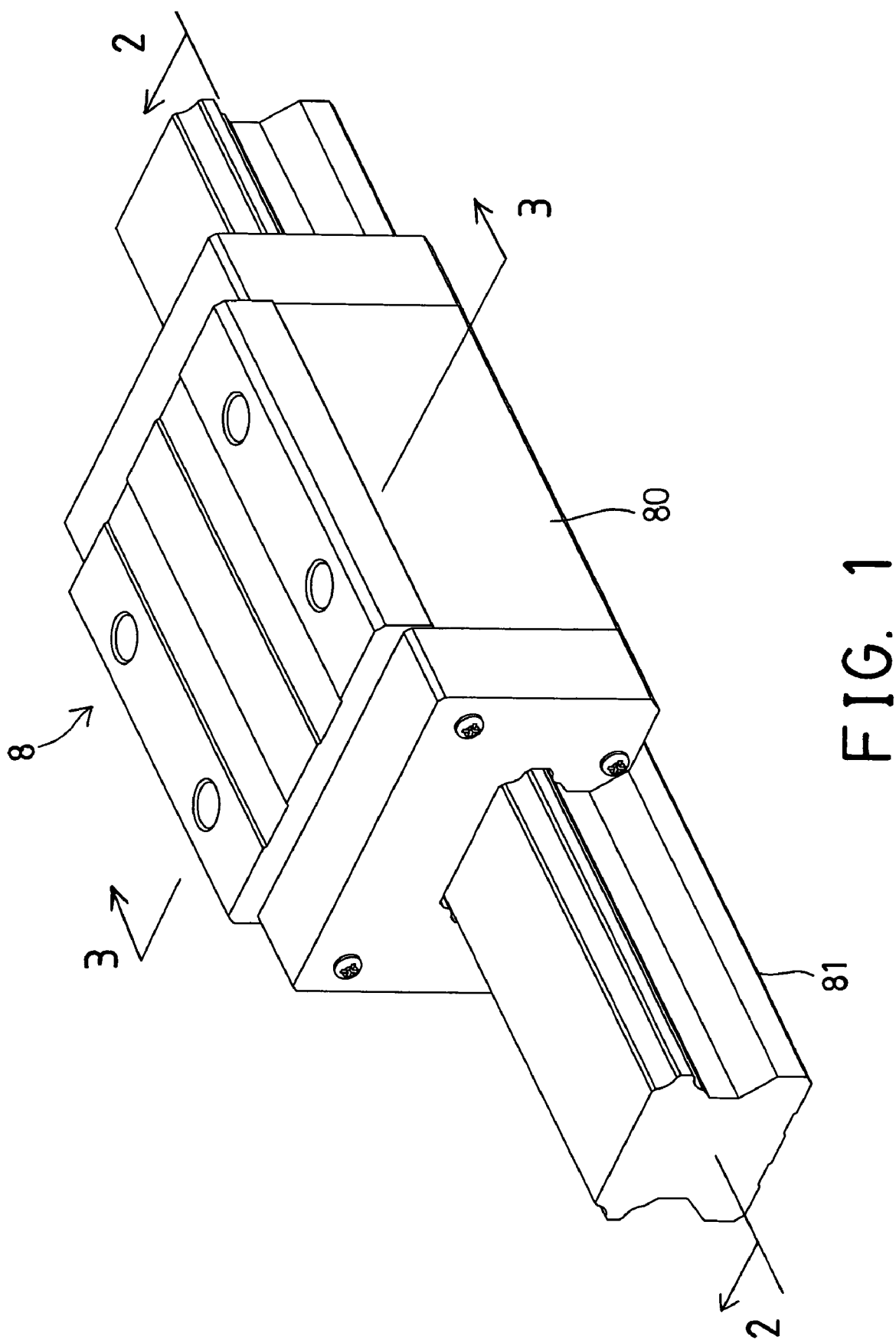
FIG. 1 is a perspective view of a linear motion guide device having a roller holder in accordance with the present invention engaged therein and engaged between two moving members.
Figure 2:
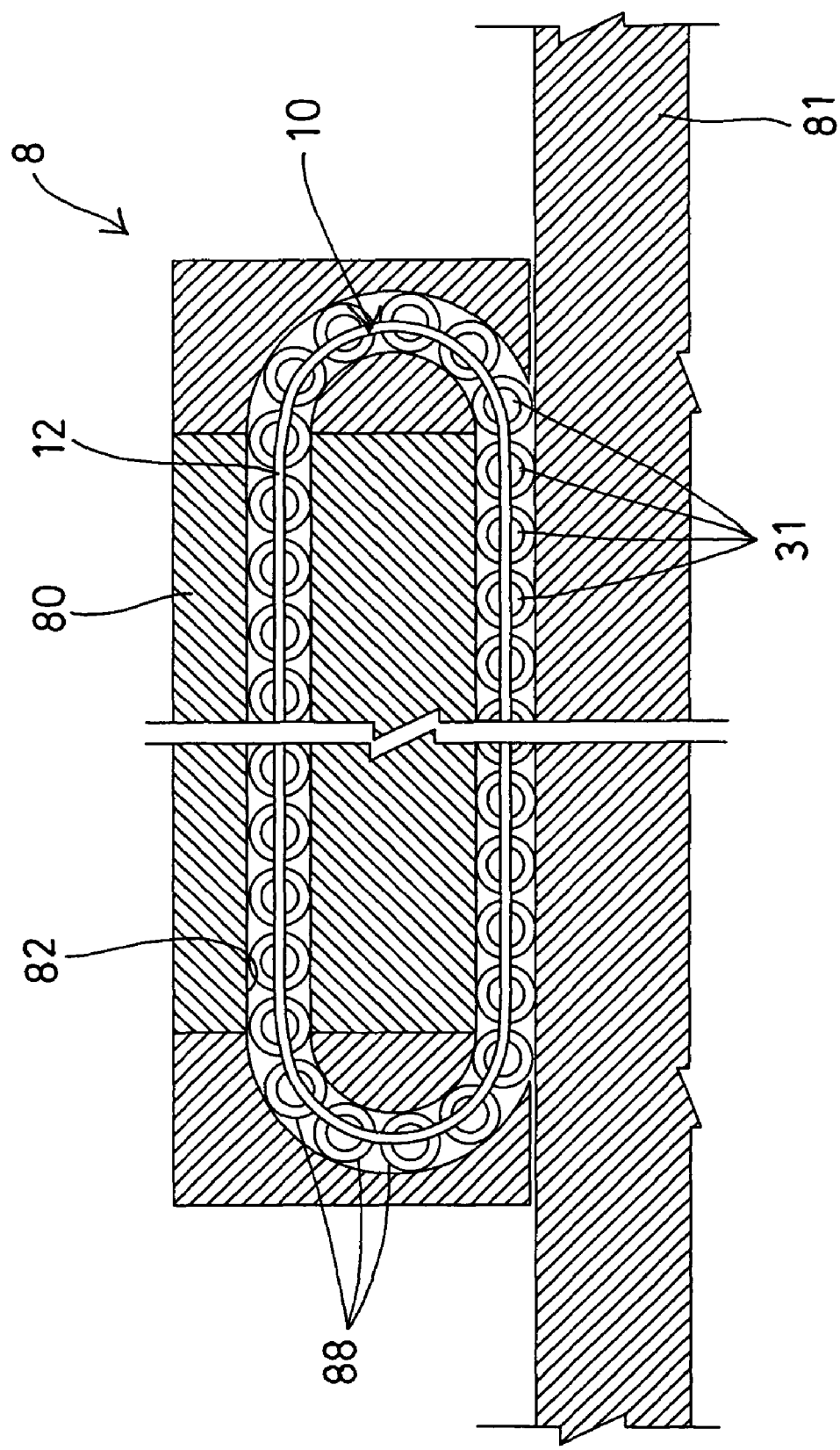
FIG. 2 is a partial cross sectional view of the roller holder taken along lines 2-2 of FIG. 1.
Figure 4:
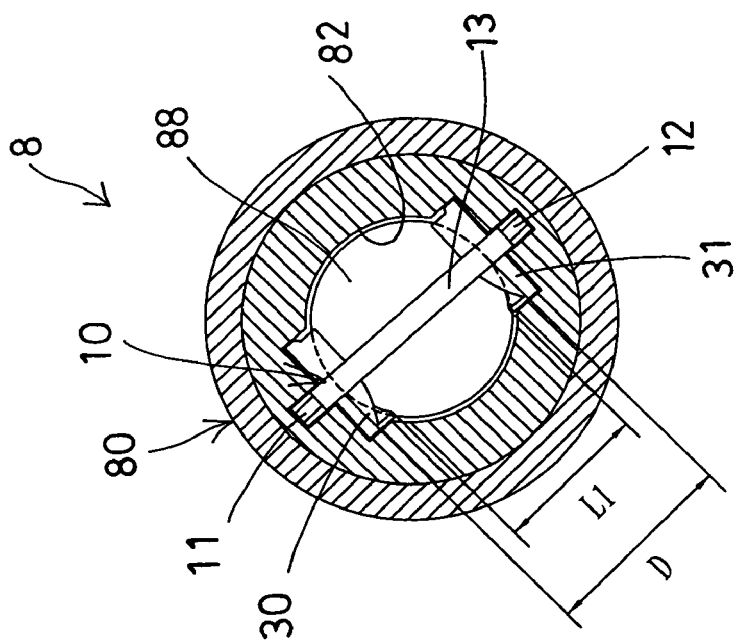
FIG. 4 is an enlarged partial cross sectional view of the roller holder.
Figure 3:
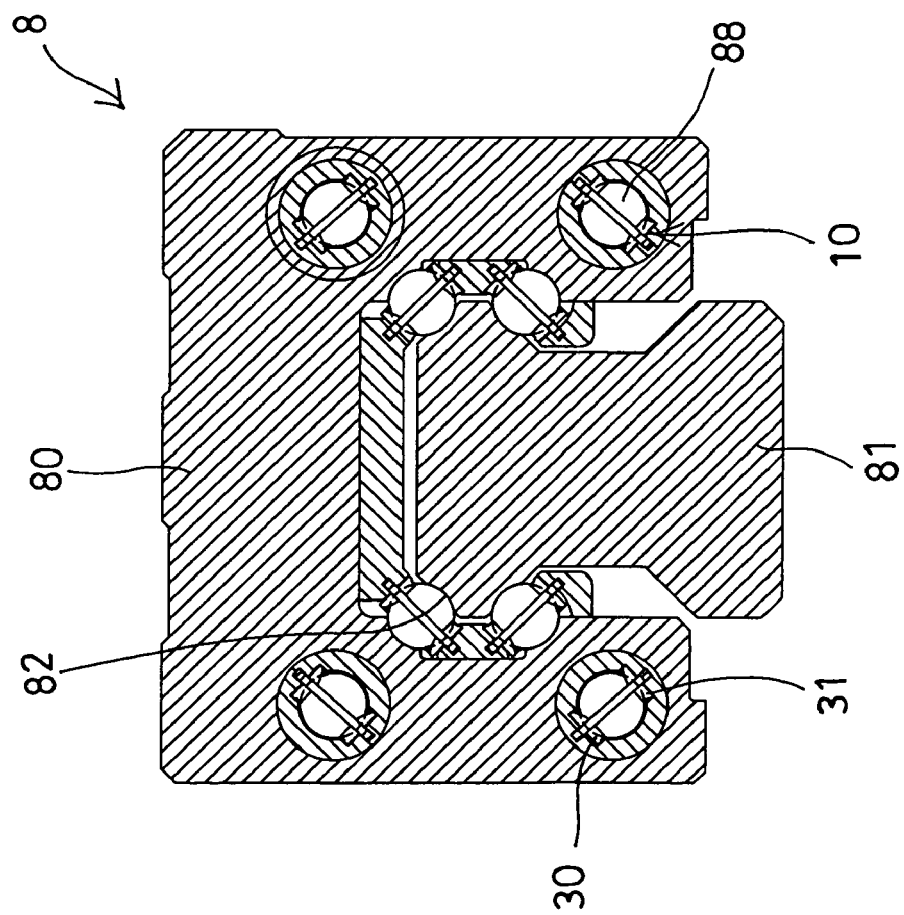
FIG. 3 is a cross sectional view of the roller holder taken along lines 3-3 of FIG. 1.

Referring to the drawings, and initially to FIGS. 1, 2 and 3, a roller holder 10 in accordance with the present invention is provided for being engaged in a linear motion guide device 8, such as engaged between a slider 80 and a track rail 81 or an endless ball guiding passage or channel 82 of the linear motion guide device 8, and particularly engaged between the guiding channels 82 of the slider 80 and the track rail 81 (FIGS. 2-4) for facilitating the sliding movement between the slider 80 and the track rail 81 of the linear motion guide device 8.

Similarly, the roller holder 10 in accordance with the present invention may also be provided for being engaged in a screw shaft device (not shown), such as engaged between a screw member and a nut member of the screw shaft device, and particularly engaged between the thread members of the screw member and the nut member for facilitating the sliding movement between the two moving members or between the screw member and the nut member. Similarly, the roller holder 10 may be provided for facilitating the moving or sliding movement between any other two moving members that are moved relative to each other.

Figure 5:
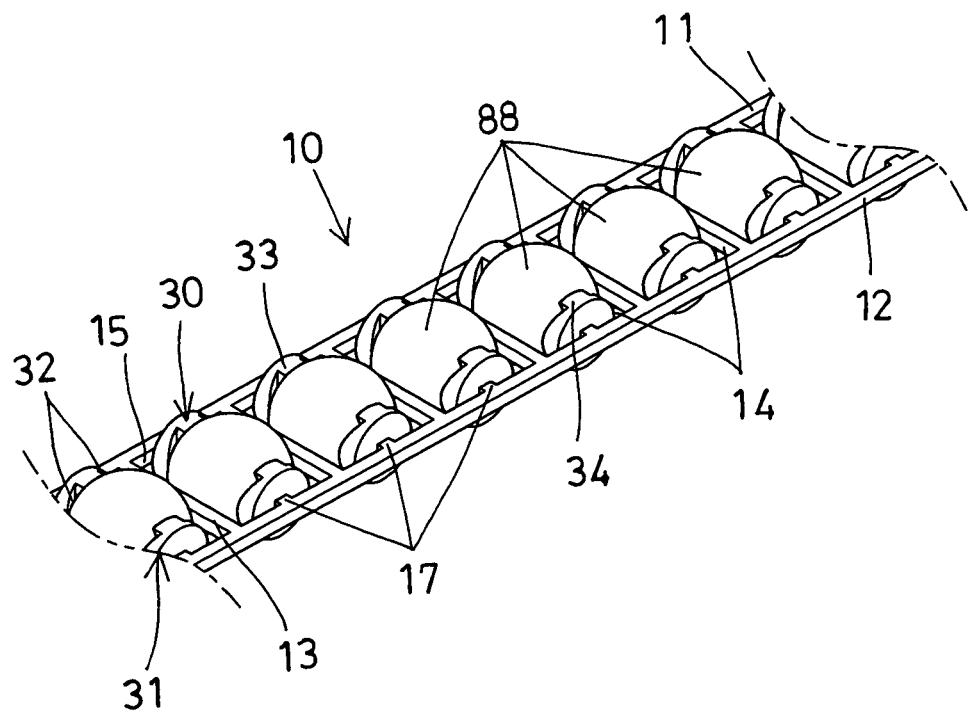
FIG. 5 is a partial perspective view illustrating a portion of the roller holder.
Figure 6:
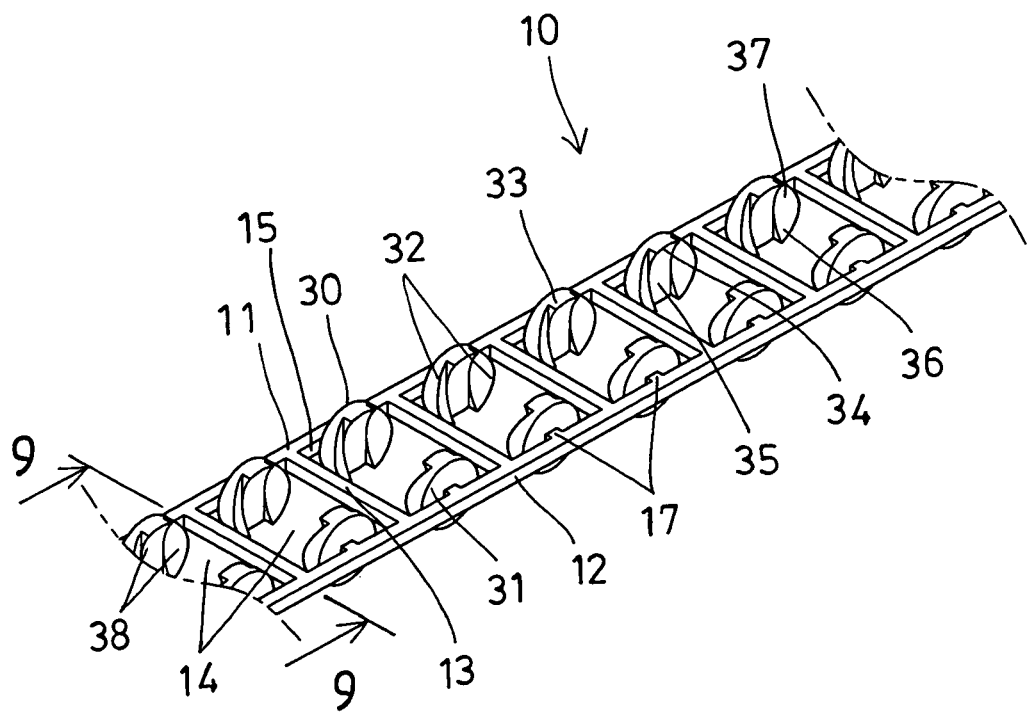
FIG. 6 is another partial perspective view of the roller holder in which the balls or roller bearing members have been removed for illustrating the detailed structure of the roller holder.
Figure 7:
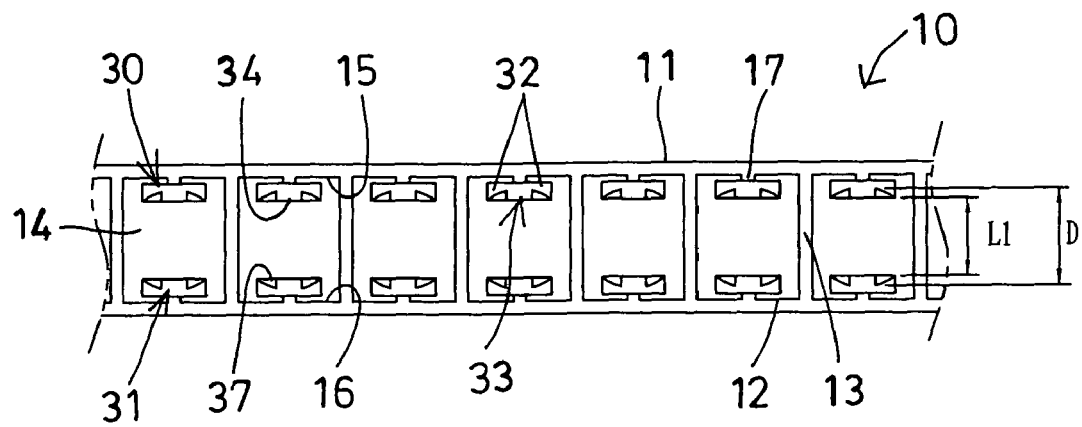
FIG. 7 is a partial top plan schematic view of the roller holder.
Figure 8:
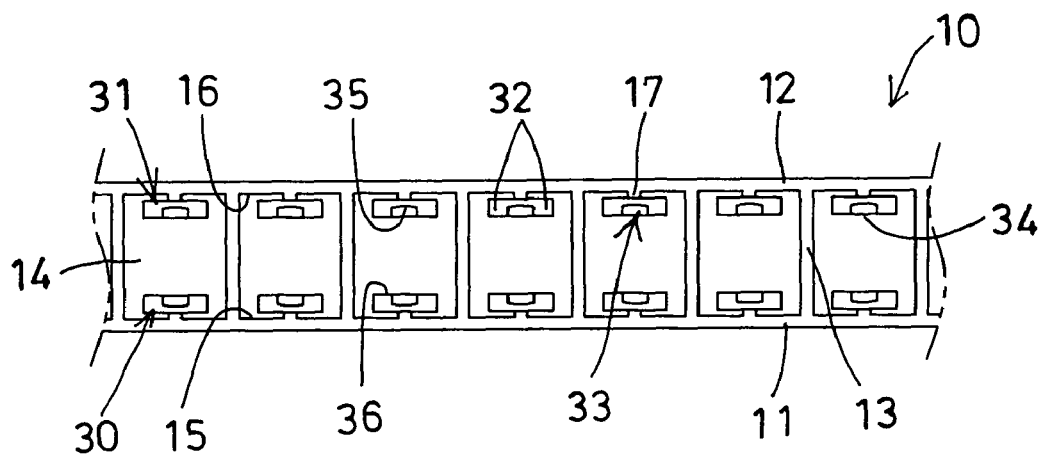
FIG. 8 is a partial bottom plan schematic view of the roller holder.
Figure 9:
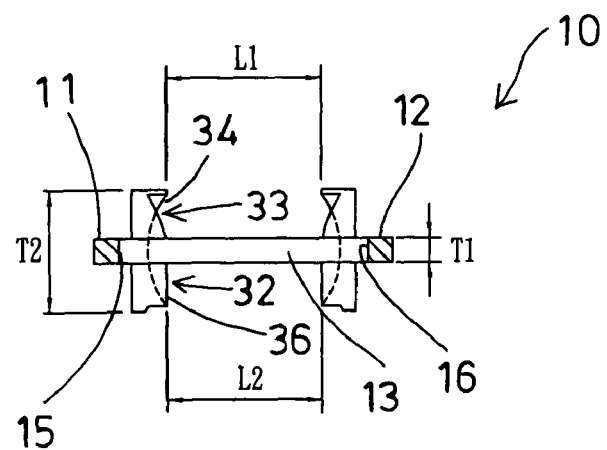
FIG. 9 is a partial cross sectional view of the roller holder, taken along lines 9-9 of FIG. 6.

Referring next to FIGS. 4-9, the roller holder 10 in accordance with the present invention comprises one or more (such as two) longitudinal and flexible cables or rods 11, 12 disposed or arranged parallel to each other, and a number of couplers 13 disposed between the rods 11-12 and equally spaced from each other for coupling the rods 11-12 together and for forming or defining a number of compartments 14 between the rods 11-12 and the couplers 13, and each compartment 14 is provided for slidably or rotatably receiving a roller or rolling member 88 therein, as best shown in FIG. 5.

The rods 11-12 include an inner surface 15, 16 facing toward each other for forming an inner peripheral surface for the compartments 14 of the roller holder 10, and each include a protrusion or ear 17 extended into each compartment 14 and/or extended from the inner surface 15, 16 of the rods 11-12 for molding or attaching or supporting a retaining device 30, 31, and the retaining devices 30, 31 of the rods 11-12 are disposed in the compartments 14 of the roller holder 10 respectively and arranged in pair with each other and faced toward each other for forming a number pairs of retaining devices 30, 31 and for slidably or rotatably and stably and snugly retaining the rolling members 88 in the compartments 14 and between the rods 11-12 and the couplers 13 and for preventing the rolling members 88 from being disengaged from the rods 11-12 and the couplers 13 of the roller holder 10.

It is to be noted that the couplers 13 may be arranged in a small distance away from the rolling members 88 or in slightly contact with the rolling members 88, and arranged to be prevented from being impacted by the rolling members 88, and it is the retaining devices 30, 31 that will retain the rolling members 88 in the compartments 14 and between the rods 11-12 and the couplers 13 of the roller holder 10. It is further to be noted that the retaining devices 30, 31 are arranged and disposed on the side portions of the rolling members 88 and attached or secured to the rods 11-12, but not attached to the couplers 13 which are arranged and disposed between the rolling members 88 such that the rolling members 88 will not impact onto the retaining devices 30, 31 and such that the working life of the retaining devices 30, 31 may be greatly increased.

The retaining devices 30, 31 include a height "T2" greater than the height "T1" of the couplers 13 (FIG. 9) for resiliently or flexibly coupling the retaining devices 30, 31 between the rods 11-12, and the couplers 13 may include a height smaller or greater than or equals to that of the rods 11-12. Each of the retaining devices 30, 31 include two or more retainers 32, 33, such as one middle retainer 33 and two side retainers 32 disposed side by side for engaging with the rolling members 88 and for rotatably and stably and snugly retain the rolling members 88 between the pair of retaining devices 30, 31. The rolling members 88 are slightly extended out of the retainers 32, 33 of the retaining devices 30, 31 of the roller holder 10 (FIGS. 2-4) for engaging between the two moving members 80, 81, and for facilitating the sliding movement between the two moving members 80, 81 that will be moved or slid relative to each other.

One of the retainers, such as the middle retainers 33 of the retaining devices 30, 31 include a projected upper portion 34 located above or extended upwardly beyond the rods 11-12 and/or the couplers 13 (FIGS. 5-8), and the spacing distance "L1" between the projected upper portions 34 of the middle retainers 33 is smaller then the outer diameter "D" of the rolling members 88 (FIGS. 4, 7) for allowing the projected upper portions 34 of the middle retainers 33 to engage with the rolling members 88 and to stably and snugly anchor or retain the rolling members 88 between the pair of retaining devices 30, 31. The middle retainers 33 include a planar lower portion 35 located below or extended downwardly beyond the rods 11-12 and/or the couplers 13, and the distance between the lower portions 35 of the middle retainers 33 is preferably smaller than or equals to or no greater than the outer diameter "D" of the rolling members 88.

The side retainers 32 each include a protruded lower portion 36 located below or extended downwardly beyond the rods 11-12 and/or the couplers 13, and the distance "L2" (FIG. 9) between the lower portions 36 of the side retainers 32 is also smaller then the outer diameter "D" of the rolling members 88 for allowing the protruded lower portions 36 of the side retainers 32 to engage with the rolling members 88 and to stably and snugly retain the rolling members 88 between the pair of retaining devices 30, 31. It is preferable that the retainers 32, 33 each include a curved inner peripheral surface 38 (FIG. 6) for smoothly engaging with the rolling members 88 with a point-contact, line-contact or surface-contact.

It is preferable that the protruded lower portions 36 of the side retainers 32 and the projected upper portions 34 of the middle retainers 33 where no protrusions extended therefrom are perpendicular to the rods 11-12, or include an included angle of about or greater than or no less than 90 degrees with the rods 11-12, for allowing the rolling members 88 to be easily engaged with the retainers 32, 33. The retaining devices 30, 31 each include one or more retainers 33 having a projected upper portion 34 for engaging with the rolling members 88, and each include one or more retainers 32 having a protruded lower portion 36 for engaging with the rolling members 88 and for stably retaining the rolling members 88 between the pair of retaining devices 30, 31.

In operation, as shown in FIGS. 2-5, the rolling members 88 may be stably retained in the compartments 14 and between the rods 11-12 and the couplers 13 of the roller holder 10 with the retainers 32, 33 of the retaining devices 30, 31, and the retaining devices 30, 31 are disposed or arranged on the side portions of the rolling members 88, but not disposed or arranged between the rolling members 88 such that the rolling members 88 may not and will not impact onto the retaining devices 30, 31 and such that the retaining devices 30, 31 will not be scraped or scrubbed by the rolling members 88, and such that the working life of the retaining devices 30, 31 may be greatly increased.

Figure 10:
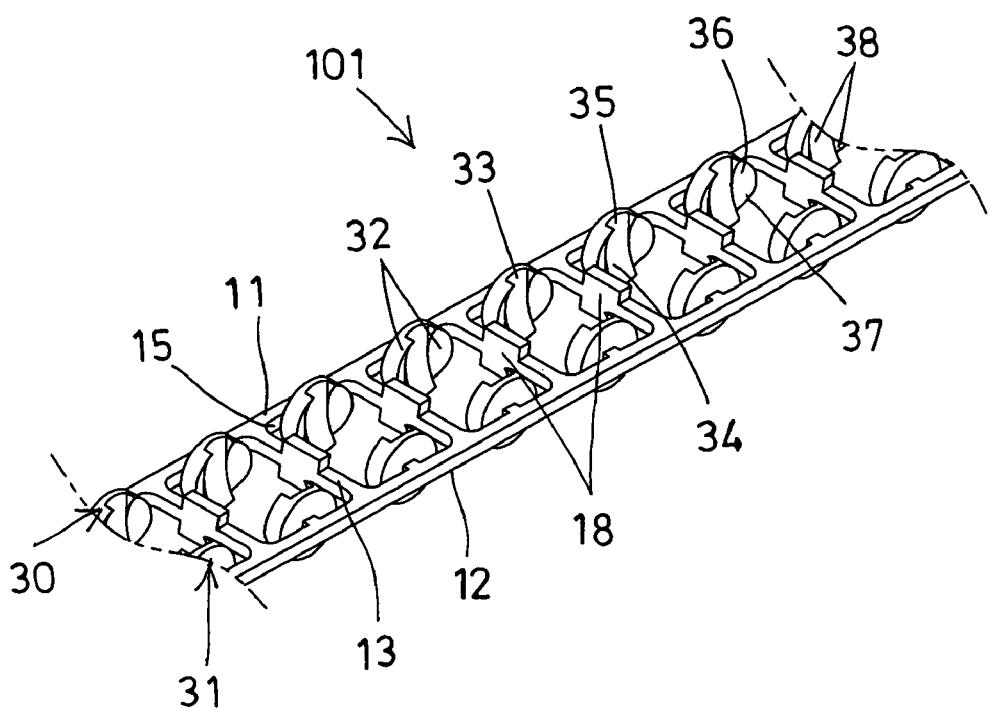
FIG. 10 is a partial perspective view similar to FIG. 6, illustrating the other arrangements of the roller holder.
Figure 11:
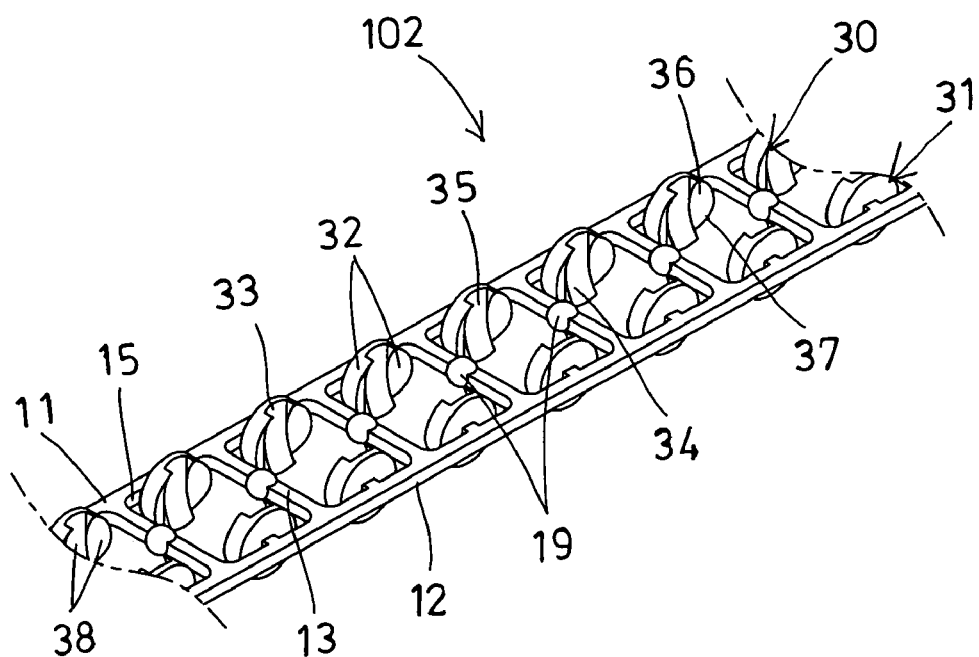
FIG. 11 is another partial perspective view similar to FIGS. 6 and 10, illustrating the further arrangement of the roller holder.

Alternatively, as shown in FIGS. 10 and 11, the roller holder 101, 102 and the retaining devices 30, 31 may be disposed or arranged up-side-down, and the protruded portions 36 of the side retainers 32 will be located or disposed or arranged above or extended upwardly beyond the rods 11-12 and/or the couplers 13 for engaging with the rolling members 88, and the projected portions 34 of the middle retainers 33 will be located or disposed or arranged below or extended downwardly beyond the rods 11-12 and/or the couplers 13 for engaging with the rolling members 88 and for allowing the rolling members 88 to be rotatably and stably and snugly retained between the pair of retaining devices 30, 31.

The roller holder 101, 102 may further include one or more reinforcing members 18, 19 attached to the couplers 13, but not to the rods 11-12, such as the rectangular reinforcing members 18 (FIG. 10), or the ball or spherical-shaped reinforcing members 19 (FIG. 11) for reinforcing the couplers 13 and for engaging with the rolling members 88 and for further stably retaining the rolling members 88 in the compartments 14 and between the rods 11-12 and the couplers 13 of the roller holder 10. The typical roller holders or strings fail to provide pairs of retaining devices 30, 31 on the side portions of the rolling members 88 and attached to the side rods 11-12, but not to the couplers 13 for preventing the rolling members 88 from impacting onto the retaining devices 30, 31.

Accordingly, the roller holder in accordance with the present invention includes a number of rollers alternately disposed and arranged in different directions for engaging between two moving members and for preventing the impact onto the roller holder and, for facilitating the sliding movement between the two moving members.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

We claim:

1. A roller holder for engaging between two moving members, said roller holder comprising:
    two longitudinal rods disposed parallel to each other, said rods each including an ear extended therefrom,
    a plurality of couplers disposed between said rods for coupling said rods together and for forming a plurality of compartments between said rods and said couplers, said ear of each said rod being extended into each compartment of said roller holder,
    a plurality of rolling members received in said compartments of said roller holder respectively, and
    two retaining devices disposed in each of said compartments of said roller holder and attached to said rods with said ears and disposed between said rods and facing toward each other for engaging with said rolling members and for retaining said rolling members in said compartments and between said rods and said couplers of said roller holder, and for retaining said rolling members between said retaining devices, and for preventing said retaining devices from being disposed between said rolling members and for preventing said retaining devices from being impacted by said rolling members.

2. The roller holder as claimed in claim 1, wherein said rods include an inner surface facing toward each other, and said retaining devices are attached to said inner surfaces of said rods.

3. The roller holder as claimed in claim 1, wherein said moving members are slider and track rail and include an endless ball guiding channel formed in said slider and said track rail for receiving said rolling members and said rods of said roller holder.

4. A roller holder for engaging between two moving members, said roller holder comprising:
    two longitudinal rods disposed parallel to each other,
    a plurality of couplers disposed between said rods for coupling said rods together and for forming a plurality of compartments between said rods and said couplers,
    a plurality of rolling members received in said compartments of said roller holder respectively, and
    two retaining devices disposed in each of said compartments of said roller holder and attached to said rods and disposed between said rods and facing toward each other for engaging with said rolling members and for retaining said rolling members in said compartments and between said rods and said couplers of said roller holder, and for retaining said rolling members between said retaining devices, and for preventing said retaining devices from being disposed between said rolling members and for preventing said retaining devices from being impacted by said rolling members, and said retaining devices each including a projected portion located above said rods and said couplers for engaging with said rolling members, and a protruded portion located below said rods and said couplers for engaging with said rolling members.

5. The roller holder as claimed in claim 4, wherein said retaining devices each include at least one first retainer having said projected portion for engaging with said rolling members, and at least one second retainer having said protruded portion for engaging with said rolling members.

6. The roller holder as claimed in claim 5, wherein said projected portion is provided on an upper portion of said at least one first retainer, and said protruded portion is provided on a lower portion of said at least one second retainer, and said projected portions of said retaining devices in each compartment of said roller holder include a spacing distance "L1" smaller then an outer diameter "D" of said rolling members, and said protruded portions of said retaining devices in each compartment of said roller holder also include a spacing distance "L2" smaller then an outer diameter "D" of said rolling members.

7. The roller holder as claimed in claim 6, wherein said at least one first and said at least one second retainers each include a curved inner peripheral surface for engaging with said rolling members.

* * * * *